United States Patent
Meeks

[15] 3,650,570
[45] Mar. 21, 1972

[54] HYDRAULICALLY ACTUATED BRAKING SYSTEM FOR UNITARY CONTROL OF DRIVEN AND TOWED VEHICLES

[72] Inventor: Walter Melvin Meeks, Henrietta, Tex.
[73] Assignees: Wayland D. Keith; Leverne E. Mangel, Wichita Falls, Tex.
[22] Filed: Jan. 12, 1970
[21] Appl. No.: 2,044

[52] U.S. Cl. ................................. 303/7, 180/14, 188/3, 280/421, 303/49
[51] Int. Cl. ............................................. B60t 7/00
[58] Field of Search ....................... 303/7, 48–49; 280/420, 421; 180/14; 188/112, 3

[56] References Cited

UNITED STATES PATENTS

| | | | |
|---|---|---|---|
| 2,848,074 | 8/1958 | Puddy | 188/3 UX |
| 2,704,585 | 3/1955 | Stromberg | 303/49 X |
| 3,339,658 | 9/1967 | Peterson | 188/3 X |
| 2,387,942 | 10/1945 | Price | 303/48 X |
| 2,160,747 | 5/1939 | Mayer et al. | 188/3 X |

Primary Examiner—Milton Buchler
Assistant Examiner—John J. McLaughlin
Attorney—Wayland D. Keith

[57] ABSTRACT

A hydraulically actuated braking system to enable the interconnecting of a driven and a towed vehicle, whereby the hydraulic fluid conduit of the driven vehicle is connected in fluid communication to a cylinder-plunger assembly by a flexible conduit, which cylinder-plunger assembly may be connected in end to end relation with an auxiliary master cylinder mounted on the towed vehicle. The auxiliary master cylinder is connected in fluid communication with the hydraulic fluid conduit system which leads to the brakes of the towed vehicle, and, by closing a valve intermediate the conduit system and the normal master cylinder of the towed vehicle, and opening a valve in a conduit intermediate the auxiliary master cylinder and the hydraulic fluid conduit system of the towed vehicle, mechanical force may be applied by the plunger of the hydraulic fluid cylinder-plunger assembly to the auxiliary master cylinder. The cylinder-plunger assembly is connected in fluid communication with the hydraulic fluid brake system of the driven vehicle, and the driven vehicle and the towed vehicle may be accurately controlled simultaneously by the application of the brake pedal of the driven vehicle. Provision is made to close a valve in a conduit intermediate the auxiliary cylinder and the conduit system of the towed vehicle, and opening a valve in the conduit leading from the original master cylinder to the conduit system of the towed vehicle, to enable the towed vehicle to be used in the same manner as if the auxiliary hydraulic cylinder arrangement was not installed thereon. It is to be pointed out that the separation of the hydraulic cylinder-plunger assembly from the auxiliary master cylinder may be accomplished without loss of hydraulic fluid.

8 Claims, 4 Drawing Figures

Patented March 21, 1972
3,650,570
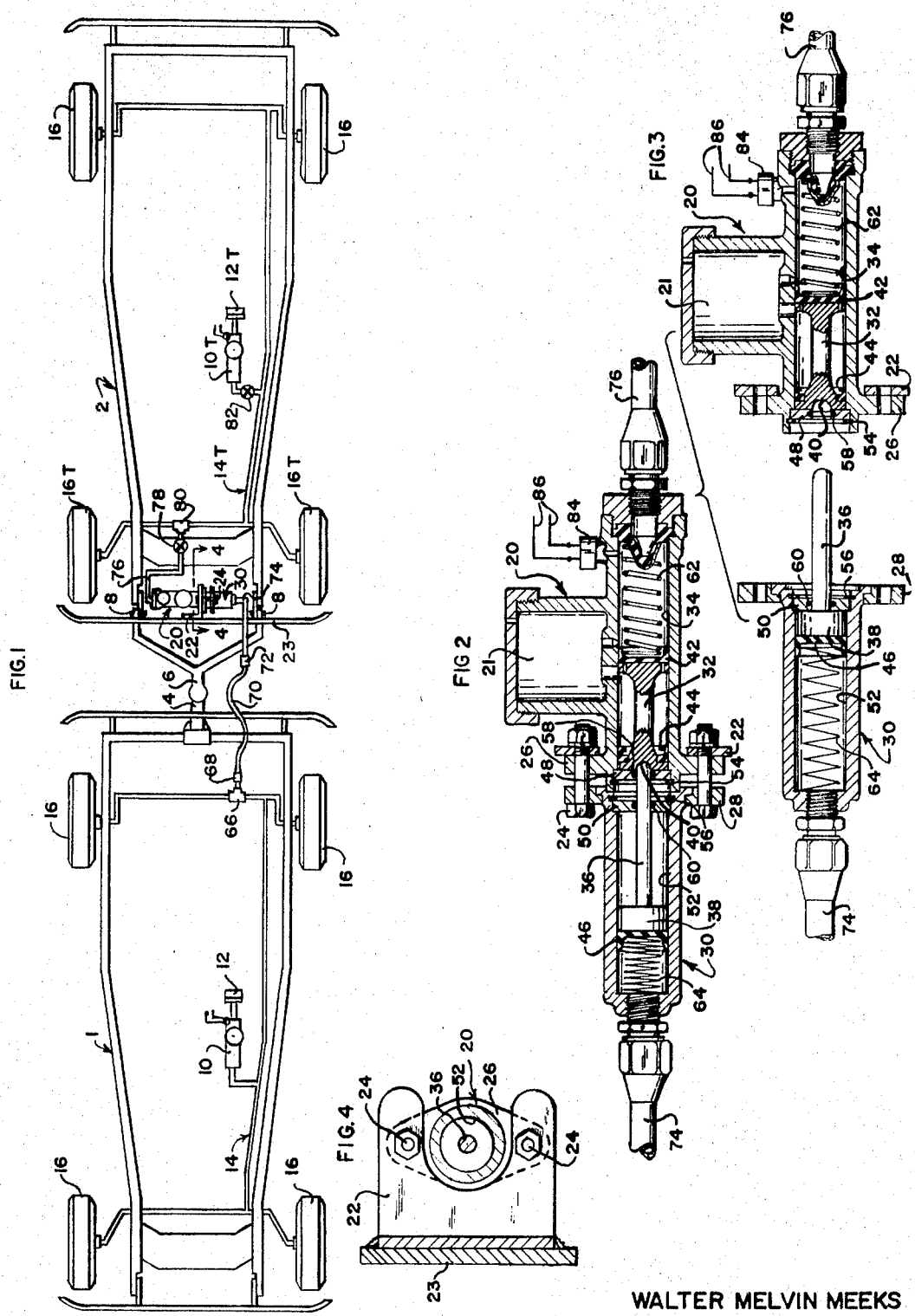
WALTER MELVIN MEEKS
*INVENTOR.*
BY Wayland D. Keith
HIS AGENT

HYDRAULICALLY ACTUATED BRAKING SYSTEM FOR UNITARY CONTROL OF DRIVEN AND TOWED VEHICLES

This invention relates to improvements in hydraulic brake systems and more particularly to a hydraulic brake system which enables a driven vehicle to tow a vehicle and control the braking sensitivity of both vehicles without having to manually actuate mechanism on the driven vehicle, except the normal brake pedal.

The present device is so constructed that the hydraulic systems of the driven vehicle and the towed vehicle may be disconnected without the loss of fluid from either system, and which disconnection can be done in a minimum of time, with each hydraulic braking system being placed in condition, in a few minutes time, to operate independently of the other, without impairing the original effectiveness of either brake system.

Various fluid actuated braking systems have been proposed heretofore, but these, in so far as known, separated live fluid lines, and even with automatic checks within the lines, some fluid was allowed to escape, and furthermore, the parted lines were subject to contamination by foreign matter, such as dirt and mud or the like.

The present invention is so constructed as to provide a separate hydraulically actuated master cylinder, which is connected with the hydraulic braking system of the towed vehicle, which master cylinder is actuated by a hydraulic cylinder-plunger assembly connected to the hydraulic system of the driven vehicle.

An object of this invention is to provide a hydraulic system for a driven vehicle to actuate a mechanism which actuates a hydraulic system of a towed vehicle, which hydraulic systems are not connected in fluid communication.

Another object of the invention is to provide a hydraulic system for a driven vehicle which may be quickly disconnected from the hydraulic system of a towed vehicle, without the loss of fluid.

Still another object of the invention is to provide a hydraulic system for a driven vehicle which may be mechanically connected to the hydraulic system of a towed vehicle in such manner that the two hydraulic braking systems may be separated and used independently, and still be as effective as originally designed.

A further object of the invention is to provide an auxiliary master cylinder for the towed vehicle, which cylinder is mechanically actuated by a hydraulic cylinder-plunger arrangement, and which system may be left on the towed vehicle, and can be de-energized by closing one valve in the hydraulic braking system of the towed vehicle and opening another valve in the hydraulic braking system thereof to effectively place the original hydraulic braking system of the towed vehicle in operative condition.

With these objects in mind and others which will become manifest as the description proceeds, reference is to be had to the accompanying drawings in which like reference characters designate like parts in the several views thereof, in which:

FIG. 1 is a diagrammatic view of the chassis of a driven vehicle and of a towed vehicle, showing the hydraulic systems thereof diagrammatically, showing the towed vehicle connected to the driven vehicle by a tow bar, and showing the hydraulic systems as being mechanically interconnected;

FIG. 2 is an enlarged, longitudinal sectional view through a master cylinder of the towed vehicle, showing the hydraulic cylinder-plunger assembly connected thereto for mechanical actuation by a hydraulic plunger;

FIG. 3 is an enlarged, fragmentary sectional view similar to FIG. 2 but showing the hydraulic cylinder-plunger assembly, of the towed vehicle, in disconnected relation with respect to the auxiliary master cylinder of the towed vehicle;

FIG. 4 is an enlarged sectional view taken on the line 4—4 of FIG. 1, looking in the direction indicated by the arrows.

With more detailed reference to the drawing, the numeral 1 designates generally a driven vehicle and the numeral 2 designates generally a towed vehicle. The driven vehicle 1 has a trailer hitch 4 connected thereto in a conventional manner, which trailer hitch usually has a connection means thereon, such as a ball, pin, or the like, to connect with the tow bar 6, which tow bar is usually hingeably connected to the towed vehicle 2 by a pin 8. FIG. 1 shows the driven vehicle and the towed vehicle connected in towed relation.

The driven vehicle has a hydraulic braking system with a master cylinder 10, which cylinder is actuated by a pedal 12 or the like, which directs hydraulic fluid under pressure into a hydraulic conduit system 14, which conduit system leads to hydraulic brakes (not shown) connected to each of the wheels 16. The hydraulic system is considered conventional and is well known in the art, therefore it is not considered necessary to illustrate such system in detail. Upon depressing brake pedal 12, hydraulic fluid will flow into conduit system 14 and to each of the wheels 16, and upon release of brake pedal 12, the hydraulic fluid will be released from the respective brake cylinders (not shown) in the wheels 16, and the hydraulic fluid will return to the hydraulic master cylinder 10 in a manner well known in the art of hydraulic brakes. The hydraulic system of the towed vehicle 2 is shown to be substantially identical with the hydraulic conduit system 14 of the driven vehicle, for simplicity of illustration and for simplicity of description and understanding. The numerals as applied to the towed vehicle 2 will be the same as the numerals applied to the driven vehicle 1, except the elements will have a suffix T thereto to designate the towed vehicle system, in so far as applicable. The primary master cylinder of the towed vehicle is indicated at 10T and has a brake pedal 12T to normally operate the mechanism therein. The hydraulic conduit system of the towed vehicle is designated 14T and leads to the brakes of the respective wheels 16T.

The towed vehicle has an auxiliary master cylinder by the numeral 20, which auxiliary cylinder is mounted on a bifurcated bracket 22 which is secured to the bumper 23 of the towed vehicle 2. The master cylinder 20 is bolted to the bifurcated bracket 22 by bolts 24, which bolts pass through bracket 22, flange 26 and flange 28 to bindingly engage a hydraulic cylinder-plunger assembly 30 in binding engagement with the end of the auxiliary master cylinder 20.

The auxiliary master cylinder 20 has a plunger 32 therein, which plunger is actuated within the bore 34 of the master cylinder by a plunger 36, which is associated with a piston 38 within cylinder-plunger assembly 30. The plunger 36 may be attached to the piston 38 and have the end thereof in bearing relation within a cup 40 in the outer end of auxiliary master cylinder piston 32. Conventional cups or fluid seals 42 and 44 are provided on auxiliary master cylinder piston 32 and a cup or fluid seal 46 is provided on piston 38 so as to prevent leakage of hydraulic fluid from the respective systems. Removable cylinder heads 48 and 50 may be provided in the bore 34 of the auxiliary master cylinder 20 and the bore 52 of hydraulic cylinder-plunger assembly 30. The respective cylinder heads 48 and 50 are preferably maintained in place by the respective snap rings 54 and 56. Each of the cylinder heads 48 and 50 is provided with the respective wiper seals 58 and 60 to maintain the cylinders free of foreign matter. A relatively strong spring 62 is provided within the bore 34 of auxiliary master cylinder 20 between cup 42 and the end of the cylinder to which the fluid conduit is connected. A relatively weak spring 64 is provided in cylinder 52 intermediate the cup 46 and the end of the cylinder to which the fluid conduit is connected. With the springs 62 and 64 in this relation, the spring 62 will normally keep the piston 32 in the position shown in FIG. 2, except when the brake of the driven vehicle is being used, and the weaker spring 64 will normally be compressed.

With the master cylinder 20 and the hydraulic cylinder-plunger assembly in this relation, a tee 66 is installed within the hydraulic conduit system 14 to which a conduit coupling 68 connects to a flexible conduit 70 in a conventional manner, and to a conduit connection 72 on conduit 74 which leads to the end of cylinder-plunger assembly 30. A conduit 76 leads from the opposite end of auxiliary master cylinder 20 to that to which the cylinder-plunger assembly is connected, and through a cut-off valve 78 and into a tee 80 within hydraulic conduit system 14T of the towed vehicle 2. A valve 82 is within the conduit which interconnects the master cylinder 10T with conduit system 14T of the towed vehicle, so when the valve 82 is closed the master cylinder 10T is rendered inoperative, and with the valve 78 open, the auxiliary hydraulic cylinder 20 is rendered operative and with the reservoir 21 of the auxiliary master cylinder 20 filled with hydraulic fluid, this master cylinder will function upon movement of master cylinder-plunger 32 by the action of plunger 36. A pressure switch 84 is connected in fluid communication with the auxiliary master cylinder 20 to function in the same manner as the pressure switch on master cylinders 10 and 10T, and with the circuit 86 connected in parallel with the circuit leading to the stop light (not shown) on the towed vehicle, the stop light will function in the proper manner upon the application of brake pedal 12.

OPERATION

In order to tow a vehicle 2 behind a driven vehicle 1, the towed vehicle 2 is connected to the trailer hitch 4 by tow bar 6. To connect the auxiliary master cylinder 20 and the plunger-cylinder assembly 30, bolts 24 connect to the respective flanges 26 and 28, in the manner shown in FIG. 2. Before the vehicles are connected, the hydraulic cylinder-plunger assembly 30 will have the plunger 36 extended and the piston 38 will be seated against piston head 50, which is held against outward movement by snap ring 56, due to the pressure exerted by weak spring 64, which will keep the piston sealed against entrance of water, dirt or other foreign matter. The strong spring 62 will keep the piston 32 at the opposite end of bore 32 from the end to which the conduit 76 is connected. With the bolts 24 securing the bracket 22, flange 26 and flange 28 in place, the device is ready to operate. By closing valve 82, between conduit system 14T and master cylinder 10T, and opening valve 78, between auxiliary master cylinder 20 and conduit system 14T of the towed vehicle, the brake pedal 12 may be applied which will direct hydraulic fluid from master cylinder 10 to normally apply pressure to each of the brakes in wheels 16. Fluid will also be directed through tee 66, conduits 70 and 74 into hydraulic cylinder-plunger assembly 30 to urge the plunger 36 outward against auxiliary master cylinder piston 32 to compress spring 62 and discharge hydraulic fluid into conduit 76 which leads through open valve 78, and with valve 82 closed, the hydraulic fluid will be directed into conduit system 14T leading to the brakes of the towed vehicle. With the valve 82 closed, the sensitivity of the brakes on each of the vehicles is uniform and the braking of the wheels is controlled by a single brake pedal 12, with perfect uniformity.

When it is desired to operate the vehicles separately the bolts 24 are removed in order to disconnect flanges 26 and 28 in the manner shown in FIG. 3. The bolts 24 may be used to bolt flange 26 to bifurcated bracket 22, then by closing valve 78 and opening valve 82, the hydraulic brake conduit system 14T may be controlled by pedal 12T and master cylinder 10T on vehicle 2. Upon disconnecting the tow bar 6 from trailer hitch 4 and moving the hydraulic cylinder-plunger assembly 30 to a position on the driven vehicle 1, it may rest there without disconnecting the fluid conduit therefrom. The brake on the driven vehicle may be operated by pedal 12 to operate the master cylinder 10 to direct hydraulic fluid into hydraulic brake system 14 and with the piston 38 resting against cylinder head 50, which is retained in place by snap ring 56, the hydraulic braking system of the driven vehicle 1 will function normally, and without loss of fluid. If desired, the plunger 36 may be a loosely positioned plunger, which may be removed without removing piston 38, when the cylinder-plunger assembly 30 is disconnected from the auxiliary master cylinder 20.

Having thus clearly shown and described the invention, what is claimed as new and desired to be secured by Letters Patent is:

1. A hydraulic braking system for a driven vehicle and a towed vehicle, which vehicles are mechanically coupled for movement over the terrain under the power of the driven vehicle, which braking system comprises;
    a. a first hydraulic braking system mounted on the driven vehicle, which braking system includes a master cylinder, a conduit system leading to the respective brakes of the driven vehicle, and a further conduit which connects the master cylinder with said conduit system leading to the brakes thereof,
        1. said master cylinder of the driven vehicle being manually operated,
    b. a second hydraulic braking system associated with the towed vehicle, which braking system includes a master cylinder, a conduit system leading to the respective brakes of the towed vehicle, and a conduit connecting the master cylinder of the towed vehicle with the conduit system leading to the brakes thereof,
        1. a valve within said conduit connecting the master cylinder of the towed vehicle to the conduit system leading to the respective brakes thereof,
    c. an auxiliary master cylinder, including a piston, mounted on the towed vehicle,
        1. a conduit connected in fluid communication with said auxiliary master cylinder and with said conduit system leading to the brakes of the towed vehicle,
        2. a valve within said conduit which interconnects said auxiliary master cylinder with the hydraulic braking system of the towed vehicle,
    d. a hydraulic conduit connected in fluid communication with the conduit system leading to the respective brakes of the driven vehicle,
        1. a hydraulic cylinder-plunger assembly operatively connected, in fluid communication, with said conduit leading from said conduit system of said driven vehicle,
    e. mechanical means interconnecting said hydraulic cylinder-plunger assembly with said auxiliary master cylinder so the plunger of said hydraulic cylinder-plunger assembly will mechanically actuate the piston of said auxiliary master cylinder, so, upon operation of said manually controlled master cylinder on said driven vehicle, said auxiliary master cylinder will transmit fluid under pressure to the brakes of the hydraulic braking system of the towed vehicle to simultaneously engage the brakes on the towed vehicle and the brakes on the driven vehicle.

2. A hydraulic braking system for a driven vehicle and a towed vehicle, which vehicles are mechanically coupled for movement over the terrain, under the power of the driven vehicle, as defined in claim 1; wherein
    a. said hydraulic conduit which is connected in fluid communication with the conduit system leading to the respective brakes of the driven vehicle, is a flexible conduit.

3. A hydraulic braking system for a driven vehicle and a towed vehicle, which vehicles are mechanically coupled for movement over the terrain, as defined in claim 2; wherein
    a. said cylinder-plunger assembly connected to said flexible conduit is connected in axial alignment with the piston of said auxiliary master cylinder.

4. A hydraulic braking system for a driven vehicle and a towed vehicle, which vehicles are coupled for movement over the terrain; as defined in claim 3, wherein
    a. fastening means detachably secure said cylinder-plunger assembly to said auxiliary master cylinder.

5. A hydraulic braking system for a driven vehicle and a towed vehicle, which vehicles are mechanically coupled for movement over the terrain under the power of the driven vehicle, as defined in claim 1; wherein
    a. said valve means interposed between said master cylinder on the towed vehicle and the conduit system leading to the respective brakes thereof is adapted to be selectively closed, and b. said valve within said conduit which interconnects said auxiliary master cylinder and the hydraulic braking system of the towed vehicle is adapted to be opened to render the hydraulic braking system of the towed vehicle simultaneously operable with the braking system of the driven vehicle.

6. A hydraulic braking system for a driven vehicle and a towed vehicle, which vehicles are mechanically coupled for movement over the terrain under the power of the driven vehicle, as defined in claim 1; wherein
   a. said cylinder-plunger assembly having the piston fitted therein in fluid tight relation,
      1. stop means limiting the outward movement of said piston,
   b. the piston of said auxiliary master cylinder being in fluid tight sealing relation with the cylinder thereof,
      1. stop means limiting the outward movement of said piston,
   c. mechanical means disconnecting the hydraulic cylinder-plunger assembly from said auxiliary master cylinder so the hydraulic cylinder-plunger assembly may be maintained with the driven vehicle and the auxiliary master cylinder may be retained with the towed vehicle without loss of hydraulic fluid from either system, to enable the use of the braking system of the driven vehicle and of the towed vehicle independently, when the vehicles are mechanically disconnected.

7. An apparatus embodying two hydraulic systems, which systems are adapted to be mechanically connected so one of the systems is synchronously operated by the other of said systems without the hydraulic fluid from one system passing into the other of the hydraulic systems, which apparatus comprises;
   a. a first master hydraulic power cylinder,
   b. a first conduit system connected in fluid communication with said first master hydraulic power cylinder and leading therefrom,
   c. a first hydraulic power actuated cylinder-plunger assembly operatively connected in fluid communication with said first conduit system,
   d. a second master hydraulic power cylinder,
      1. a second conduit system connected in fluid communication with said second master hydraulic power cylinder and leading therefrom,
   e. a second hydraulic power actuated cylinder-plunger assembly operatively connected, in fluid communication, with said second conduit system,
   f. an auxiliary master hydraulic power cylinder,
      1. said second conduit system being connected in fluid communication with said auxiliary master hydraulic cylinder,
      2. selectively controlable valve means intermediate said auxiliary master hydraulic power cylinder and said conduit system leading to said second hydraulic power actuated cylinder-plunger assembly,
   g. selectively controllable valve means intermediate said second master hydraulic power cylinder and said second conduit system leading to said second hydraulic power actuated cylinder-plunger assembly,
   h. said plunger extending from said first hydraulic power actuated cylinder-plunger assembly and being connected, in power transmitting relation with said auxiliary master hydraulic power cylinder, so upon actuation of said first master hydraulic power cylinder, said plunger of said first hydraulic power actuated cylinder will actuate said auxiliary master hydraulic power cylinder, which, in turn, will actuate said second hydraulic power actuated cylinder,
   i. said first power actuated cylinder being separable with respect to said auxiliary master hydraulic power cylinder so no loss of hydraulic fluid will be had when the two systems are separated, and
   j. fastening means detachably connecting said first hydraulic power actuated cylinder-plunger assembly with said auxiliary master hydraulic power cylinder to transmit lineal force to said auxiliary master hydraulic power cylinder.

8. An apparatus embodying two hydraulic systems, as defined in claim 7, wherein
   a. said second hydraulic system has a plurality of cylinder-plunger assemblies operatively connected in fluid communication with said second conduit system.

* * * * *